United States Patent
Jung et al.

(10) Patent No.: US 10,759,889 B2
(45) Date of Patent: Sep. 1, 2020

(54) ABS GRAFT COPOLYMER, METHOD OF PREPARING THE SAME, AND THERMOPLASTIC RESIN COMPOSITION INCLUDING THE SAME

(71) Applicant: LG CHEM, LTD., Seoul (KR)

(72) Inventors: Yu Sung Jung, Daejeon (KR); Joo Byung Chai, Daejeon (KR); Jong Beom Kim, Daejeon (KR); Chang Sull Kim, Daejeon (KR); Eun Seon Park, Daejeon (KR); Tae Young Jeon, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 50 days.

(21) Appl. No.: 16/099,544

(22) PCT Filed: Dec. 15, 2017

(86) PCT No.: PCT/KR2017/014779
§ 371 (c)(1),
(2) Date: Nov. 7, 2018

(87) PCT Pub. No.: WO2018/124562
PCT Pub. Date: Jul. 5, 2018

(65) Prior Publication Data
US 2019/0185606 A1    Jun. 20, 2019

(30) Foreign Application Priority Data

Jan. 2, 2017    (KR) .................. 10-2017-0000096
Dec. 14, 2017    (KR) .................. 10-2017-0171765

(51) Int. Cl.
| | | |
|---|---|---|
| C08F 279/04 | (2006.01) | |
| C08L 25/12 | (2006.01) | |
| C08F 2/24 | (2006.01) | |
| C08F 4/40 | (2006.01) | |
| C08F 2/44 | (2006.01) | |
| C08L 55/02 | (2006.01) | |
| C08F 2/38 | (2006.01) | |

(52) U.S. Cl.
CPC .............. *C08F 279/04* (2013.01); *C08F 2/24* (2013.01); *C08F 2/38* (2013.01); *C08F 2/44* (2013.01); *C08F 4/40* (2013.01); *C08L 25/12* (2013.01); *C08L 55/02* (2013.01); *C08L 2201/08* (2013.01)

(58) Field of Classification Search
CPC .................................. C08L 55/02; C08F 2/24
See application file for complete search history.

(56) References Cited

FOREIGN PATENT DOCUMENTS

| | | |
|---|---|---|
| CN | 101429266 A | 5/2009 |
| JP | H11309361 | 11/1999 |
| KR | 20000018421 | 4/2000 |
| KR | 20020039853 | 5/2002 |
| KR | 20070060681 | 6/2007 |
| KR | 20120031915 | 4/2012 |
| KR | 20130057139 | 5/2013 |
| KR | 20140019101 | 2/2014 |
| KR | 101534378 | 7/2015 |

OTHER PUBLICATIONS

Anonymous, entry for registry No. 161650-43-7 of STN's file registry, Mar. 22, 1995.*
LG CHEM, electronic translation of KR 2013057139 (Oct. 2014).*
Hagiwara et al., electronic translation of JP 11-309361 (Nov. 1999).*
Search Report dated Apr. 13, 2018 for PCT Application No. PCT/KR2017/014779.

* cited by examiner

Primary Examiner — Jeffrey C Mullis

(57) ABSTRACT

The present invention relates to an ABS graft copolymer, a method of preparing the same, and a thermoplastic resin composition including the same. More specifically, when an ABS graft copolymer is prepared using emulsion polymerization, a phosphate ester-based reactive emulsifier capable of acting as a metal deactivator is added, thereby reducing the amount of undesired residues remaining in the ABS graft copolymer latex. As a result, thermal stability may be improved without adding a heat stabilizer. In addition, compatibility between the ABS graft copolymer and the aromatic vinyl compound-vinyl cyanide compound copolymer may be improved by the phosphate ester-based reactive emulsifier. Therefore, a final molded part having improved impact resistance, e.g., increased impact strength, and having improved appearance quality, e.g., excellent whiteness, while having excellent thermal stability may be prepared.

14 Claims, No Drawings

ABS GRAFT COPOLYMER, METHOD OF PREPARING THE SAME, AND THERMOPLASTIC RESIN COMPOSITION INCLUDING THE SAME

CROSS-REFERENCE TO RELATED APPLICATIONS

This application is a U.S. National Phase of International Application No. PCT/KR2017/014779, filed Dec. 15, 2017 which claims priority to Korean Patent Application No. 10-2017-0000096, filed on Jan. 2, 2017, and Korean Patent Application No. 10-2017-0171765, re-filed on Dec. 14, 2017, based on the priority of the above patent, in the Korean Intellectual Property Office, the disclosures of each of which are incorporated herein by reference.

TECHNICAL FIELD

The present invention relates to an ABS graft copolymer, a method of preparing the same, and a thermoplastic resin composition including the same.

According to the present invention, when emulsion polymerization is performed to prepare an ABS graft copolymer, a phosphate ester-based reactive emulsifier is added at specific time point. As a result, a final molded part having greatly improved thermal stability, impact resistance such as impact strength, and appearance characteristics such as whiteness may be manufactured.

BACKGROUND ART

In addition to good rigidity, chemical resistance, and impact resistance, acrylonitrile-butadiene-styrene (ABS) copolymers have relatively good physical properties, such as moldability and gloss. Therefore, ABS copolymers are widely used as housings or interior/exterior materials for various products, such as electrical/electronic parts, office equipment, and automobile parts.

In general, when an ABS copolymer having improved impact resistance is prepared, a diene rubber latex such as a butadiene rubber is graft-copolymerized with styrene and acrylonitrile using emulsion polymerization, and then the prepared copolymer is kneaded with a SAN resin, such as styrene-acrylonitrile copolymers, and a thermoplastic resin, such as polystyrene and polymethyl methacrylate, to prepare a resin composition.

However, when emulsion polymerization is performed, reactants, such as polymerization water, monomers, an emulsifier, an initiator, and a molecular weight modifier, are usually included. Since an excess of these reactants remains in a prepared latex after emulsion polymerization, thermal stability is lowered during thermoforming, resulting in discoloration of a final product and degradation of physical properties of the final product.

PRIOR ART DOCUMENT

[Patent Document] (Patent Document 1) KR 10-1515675 B1

DISCLOSURE

Technical Problem

Therefore, the present invention has been made in view of the above problems, and it is one object of the present invention to provide a method of preparing an ABS graft copolymer, in which the amount of undesired residues remaining in the ABS graft copolymer latex is greatly reduced, and a heat stabilizer need not be additionally added, and an ABS graft copolymer prepared by the method.

It is another object of the present invention to provide a thermoplastic resin composition including the ABS graft copolymer prepared according to the method, wherein the thermoplastic resin composition has improved impact resistance, e.g., increased impact strength, and improved appearance quality, e.g., excellent whiteness, while having excellent thermal stability, e.g., improved retention-associated heat discoloration properties.

The above and other objects can be accomplished by the present disclosure described below.

Technical Solution

In accordance with one aspect of the present invention, provided is an ABS graft copolymer, wherein the ABS graft copolymer is obtained by graft-copolymerizing 0.05 to 1 part by weight of a phosphate ester-based reactive emulsifier represented by Formula 1 below onto 100 parts by weight of a monomer mixture containing 50 to 70% by weight of a conjugated diene rubber latex (based on solids), 15 to 35% by weight of an aromatic vinyl compound, and 5 to 15% by weight of a vinyl cyanide compound:

[Formula 1]

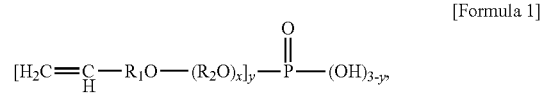

wherein $R_1$ is an alkylene having 1 to 10 carbon atoms, $R_2$ is a linear or branched alkylene having 3 to 10 carbon atoms, x is an integer of 1 to 4, and y is an integer of 1 to 3.

In accordance with another aspect of the present invention, provided is a method of preparing ABS graft copolymer, including A) a first polymerization step of feeding 50 to 70 parts by weight of a conjugated diene rubber latex, 5 to 15 parts by weight of an aromatic vinyl compound, 1 to 10 parts by weight of a vinyl cyanide compound, 0.05 to 1 part by weight of an emulsifier, 0.01 to 0.5 parts by weight of an initiator, and 0.001 to 0.5 parts by weight of an oxidation-reduction catalyst into a reactor batchwise, based on 100 parts by weight of the total composition containing the conjugated diene rubber latex, the aromatic vinyl compound, and the vinyl cyanide compound, and performing graft polymerization; B) a second polymerization step of performing graft polymerization while continuously feeding an emulsion containing 15 to 30 parts by weight of the aromatic vinyl compound, 5 to 15 parts by weight of the vinyl cyanide compound, 0.05 to 0.5 parts by weight of a molecular weight modifier, and 0.05 to 0.5 parts by weight of the initiator based on 100 parts by weight of the total composition when a polymerization conversion rate reaches 5 to 40%; and C) a third polymerization step of performing graft polymerization while continuously feeding 0.05 to 1 part by weight of a phosphate ester-based reactive emulsifier based on 100 parts by weight of the total composition when a polymerization conversion rate reaches 75 to 95%, wherein the phosphate ester-based reactive emulsifier is a compound represented by Formula 1.

In accordance with yet another aspect of the present invention, provided is a thermoplastic resin composition including 10 to 50% by weight of the ABS graft copolymer prepared according to the method and 50 to 90% by weight of an aromatic vinyl compound-vinyl cyanide compound copolymer.

Advantageous Effects

As apparent from the foregoing, the present invention advantageously provides an ABS graft copolymer and a method of preparing the same. According to the present invention, when an ABS graft copolymer is prepared using emulsion polymerization, a phosphate ester-based reactive emulsifier capable of acting as a metal deactivator is added at a specific time point. As a result, the amount of undesired residues in the ABS graft copolymer latex can be greatly reduced, and a polymerization conversion rate and a grafting degree can be increased. Thus, a high-quality ABS graft copolymer having a low amount of solidified substances in the latex can be prepared in a high yield.

In addition, when the ABS graft copolymer prepared according to the present invention is used, the thermal stability of a final product can be greatly improved, e.g., the degree of retention-associated heat discoloration of the final product can be greatly lowered, without additionally adding a heat stabilizer.

In addition, when the ABS graft copolymer according to the present invention is used, a thermoplastic resin composition having improved impact resistance, e.g., increased impact strength, and having improved appearance quality, e.g., excellent whiteness, while having excellent thermal stability, can be obtained.

BEST MODE

The present inventors confirmed that, when a phosphate ester-based reactive emulsifier including a phosphate functional group capable of acting as a metal ion deactivator is added at a specific time point during emulsion polymerization to prepare an ABS graft copolymer, the amount of undesired residues remaining in the latex is greatly reduced. In addition, the present inventors confirmed that, when the prepared ABS graft copolymer is included in a thermoplastic resin composition, thermal stability, impact resistance, and appearance characteristics of a final molded part are significantly improved. Based on these findings, the present inventors continued to further study and completed the present invention.

The ABS graft copolymer of the present invention is obtained by graft-copolymerizing 0.05 to 1 part by weight of a phosphate ester-based reactive emulsifier represented by Formula 1 below onto 100 parts by weight of a monomer mixture containing 50 to 70% by weight or 55 to 65% by weight of a conjugated diene rubber latex (based on solids); 15 to 35% by weight or 20 to 30% by weight of an aromatic vinyl compound; and 5 to 15% by weight or 8 to 15% by weight of a vinyl cyanide compound:

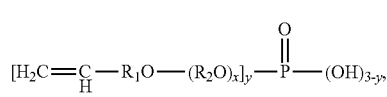

[Formula 1]

wherein $R_1$ is an alkylene having 1 to 10 carbon atoms, $R_2$ is a linear or branched alkylene having 3 to 10 carbon atoms, x is an integer of 1 to 4, and y is an integer of 1 to 3.

According to the present invention, when an ABS graft copolymer is prepared, a phosphate ester-based reactive emulsifier having a phosphate functional group capable of acting as a metal deactivator is added at a specific time point. Thus, when the ABS graft copolymer of the present invention is used, a heat stabilizer need not be separately added during thermoforming, such as extrusion or injection molding. Accordingly, a heat stabilizer-free resin composition may be prepared. In addition, discoloration resistance of a final molded part may be greatly improved at high temperatures.

As another example, the ABS graft copolymer of the present invention may be obtained by graft-copolymerizing 0.1 to 0.8 parts by weight, 0.1 to 0.5 parts by weight, 0.3 to 0.6 parts by weight, or 0.1 to 0.3 parts by weight of the phosphate ester-based reactive emulsifier represented by Formula 1 onto 100 parts by weight of the monomer mixture. Within this range, polymerization conversion rate and grafting degree of the ABS copolymer may be increased, and a final resin composition may have excellent physical properties, such as whiteness, thermal stability, and impact resistance.

In addition, in Formula 1 representing the phosphate ester-based reactive emulsifier of the present invention, preferably, $R_1$ is an alkylene having 1 to 3 carbon atoms, $R_2$ is a linear or branched alkylene having 3 to 10 carbon atoms, x is an integer of 1 to 4, and y is an integer of 1 to 3. In this case, thermal stability of the ABS graft copolymer is improved. Thus, a final resin composition may have excellent appearance characteristics, such as whiteness, and excellent impact resistance. In addition, discoloration resistance of the resin may be improved at high temperatures.

For example, the method of preparing an ABS graft copolymer according to the present invention may include A) a first polymerization step of feeding a conjugated diene rubber latex, an aromatic vinyl compound, a vinyl cyanide compound, an emulsifier, an initiator, and an oxidation-reduction catalyst into a reactor batchwise, and performing graft polymerization; B) a second polymerization step of performing graft polymerization while continuously feeding an emulsion containing the aromatic vinyl compound, the vinyl cyanide compound, a molecular weight modifier, and the initiator when a polymerization conversion rate reaches 5 to 40%; and C) a third polymerization step of performing graft polymerization while continuously feeding the phosphate ester-based reactive emulsifier represented by Formula 1 when a polymerization conversion rate reaches 75 to 95% In this case, the amount of undesired residues remaining in the latex may be greatly reduced. In addition, when the ABS graft copolymer is used to prepare a thermoplastic resin composition, thermal stability, impact resistance, and appearance characteristics of a final molded part may be greatly improved.

In the present invention, for example, after drying, the weight of a latex is measured to obtain total solids content, and a polymerization conversion rate is calculated using Equation 1 below:

Polymerization conversion rate (%)=[total solids content (TSC)×(total amount of monomers and additives fed)]/[100−(total amount of additives fed excluding monomers)] [Equation 1]

In the present invention, continuous feed is contrary to batch feed. According to continuous feed, materials to be supplied to a reaction may be continuously fed for a predetermined period of time, e.g., for 30 or more minutes, 60 or more minutes, or 90 or more minutes after start of the reaction to 3 or less hours or 2 or less hours before the end of the reaction, without a rest period, or may be fed dropwise.

Hereinafter, the method of preparing an ABS graft copolymer according to the present invention will be described in detail stepwise.

A) First Polymerization Step

According to the present invention, in the first polymerization step, a conjugated diene rubber latex, an aromatic vinyl compound, a vinyl cyanide compound, an emulsifier, an initiator, and an oxidation-reduction catalyst are fed into a reactor batchwise, and graft polymerization is performed.

For example, the conjugated diene rubber latex of the first polymerization step is obtained by performing emulsion polymerization of a conjugated diene compound having a structure in which double bonds and single bonds are alternately arranged, and includes a conjugated diene rubber polymer.

For example, the conjugated diene rubber polymer may include one or more selected from a butadiene polymer, a butadiene-styrene copolymer, a butadiene-acrylonitrile copolymer, an ethylene-propylene copolymer, or polymers derived therefrom, preferably a butadiene polymer or a butadiene-styrene copolymer.

In the present invention, the term "derived polymer" refers to a polymer obtained by copolymerizing other monomeric compounds or polymers, which are not included in the original polymer, or a polymer obtained by polymerizing the derivatives of conjugated compounds.

In the present invention, the derivative refers to a compound in which hydrogen atoms or atomic groups of the original compound are substituted with other atoms or atomic groups, e.g., a halogen group or an alkyl group.

For example, the rubber polymer included in the conjugated diene rubber latex may have an average particle diameter of 2,500 to 4,500 Å, preferably 2,800 to 4,000 Å, most preferably 3,000 to 3,600 Å. Within this range, a grafting degree may be excellent, and a final product may have excellent impact strength.

In the present invention, the average particle diameter of the rubber polymer may be measured, e.g., using dynamic light scattering using a Nicomp 380.

For example, the conjugated diene rubber latex may have a gel content of 60 to 99% by weight, preferably 70 to % by weight, most preferably 75 to 95% by weight. Within this range, a final product may have excellent mechanical properties, such as impact strength.

In the present invention, for example, coagulated latex is washed and dried, and the obtained rubber agglomerate is separated into a sol and a gel, and weights are measured, and the gel content can be calculated according to Equation 2 below:

$$\text{Gel content (\% by weight)} = [\text{Weight of insoluble substance (gel)/Total weight of sample}] \times 100 \quad \text{[Equation 2]}$$

For example, in the first polymerization step, the conjugated diene rubber latex may be fed in an amount of 50 to 70 parts by weight or 55 to 65 parts by weight. Within this range, a grafting degree may be excellent, and an ABS graft copolymer may have excellent mechanical strength, such as impact strength (the weight of the latex is based on solids).

For example, the aromatic vinyl compound grafted onto the conjugated diene rubber polymer may be one or more selected from the group consisting of styrene, alpha-methylstyrene, alpha-ethylstyrene, ortho-ethylstyrene, para-ethylstyrene, 2,4-dimethylstyrene, and derivatives thereof, preferably styrene.

For example, the vinyl cyanide compound grafted onto the conjugated diene rubber polymer may be one or more selected from acrylonitrile, methacrylonitrile, and ethacrylonitrile, preferably acrylonitrile.

In the first polymerization step, the aromatic vinyl compound and the vinyl cyanide compound are preferably fed in an amount of 7 to 35% by weight or 15 to 30% by weight based on 100% by weight of the total amount of the aromatic vinyl compound and the vinyl cyanide compound used in preparation of the ABS graft copolymer of the present invention. In this case, since polymerization efficiency is improved, a graft copolymer having a high grafting degree and a high conversion rate may be prepared. Therefore, a final resin composition may have excellent mechanical strength, such as impact strength.

As a specific example, in the first polymerization step, the aromatic vinyl compound may be fed in an amount of 5 to 15 parts by weight or 5 to 10 parts by weight. Within this range, polymerization efficiency may be improved, and a graft copolymer having a high grafting degree and a high polymerization conversion rate may be prepared.

In addition, in the first polymerization step, the vinyl cyanide compound may be fed, for example, in an amount of 1 to 10 parts by weight or 2 to 7 parts by weight. Within this range, a graft copolymer having a high grafting degree and a high conversion rate may be prepared. Therefore, impact resistance of the ABS resin composition may be improved.

Emulsifiers commonly used in graft polymerization in the art to which the present invention pertains are not particularly limited and may be used as the emulsifier of the first polymerization step. The emulsifier may be one or more non-reactive emulsifiers selected from the group consisting of an alkyl aryl sulfonate, an alkalimethyl alkyl sulfate, a sulfonated alkylester, a fatty acid salt, and a rosin acid salt, preferably a fatty acid salt.

As another example, the emulsifier of the first polymerization step may be the phosphate ester-based reactive emulsifier represented by Formula 1. In this case, since the amount of residues remaining in the latex is reduced during graft polymerization, it is not necessary to additionally add a heat stabilizer. In addition, when a resin composition is prepared, the emulsifier may improve compatibility between the resin composition and a matrix resin, thereby improving mechanical properties and discoloration resistance.

As another example, the emulsifier of the first polymerization step may be a mixture of the non-reactive emulsifier and the phosphate ester-based reactive emulsifier. In this case, stability of graft polymerization may be improved, and a graft-polymerized latex having a high grafting degree, in which the content of solidified substances is reduced, may be prepared. Therefore, an ABS graft resin composition may have excellent physical properties, such as impact strength and discoloration resistance.

For example, in the first polymerization step, the emulsifier may be fed in an amount of 0.05 to 1 part by weight, 0.1 to 1 part by weight, or 0.1 to 0.5 parts by weight. In this case, polymerization stability may be improved, and a final resin composition may have excellent appearance characteristics, such as whiteness and discoloration resistance.

Initiators commonly used in preparation of an ABS graft copolymer in the art are not particularly limited and may be used as the initiator of the present invention. Preferably, the initiator includes peroxy compounds, such as t-butyl hydroperoxide, paramethane hydroperoxide, cumene hydroperoxide, diisopropyl benzene hydroperoxide, and benzoyl peroxide, persulfate compounds, such as potassium persulfate, sodium persulfate, and ammonium persulfate, or mixtures thereof.

For example, in the first polymerization step, the initiator may be fed in an amount of 0.01 to 0.5 parts by weight or 0.01 to 0.1 parts by weight. Within this range, polymerization efficiency may be improved, and a graft copolymer having a high grafting degree and a high polymerization conversion rate may be prepared.

For example, the oxidation-reduction catalyst may include one or more selected from the group consisting of ferrous sulfide, dextrose, sodium pyrophosphate, sodium sulfite, sodium formaldehyde sulfoxylate, and sodium ethylenediamine tetraacetate, preferably ferrous sulfide, dextrose, and sodium pyrophosphate.

For example, in the first polymerization step, the oxidation-reduction catalyst may be fed in an amount of 0.001 to 0.5 parts by weight or 0.01 to 0.3 parts by weight. Within this range, the activity of the initiator may be increased, and polymerization efficiency may be improved.

As a specific example, based on 100 parts by weight of the total amount of the conjugated diene rubber latex, the aromatic vinyl compound, and the vinyl cyanide compound used in the first polymerization step, 50 to 70 parts by weight of the conjugated diene rubber latex, 5 to 15 parts by weight of the aromatic vinyl compound, 1 to 10 parts by weight of the vinyl cyanide compound, 0.05 to 1 part by weight of the emulsifier, 0.01 to 0.5 parts by weight of the initiator, and 0.001 to 0.5 parts by weight of the oxidation-reduction catalyst may be fed into a reactor batchwise, and graft polymerization may be performed.

In addition, in the first polymerization step, the conjugated diene rubber latex, the aromatic vinyl compound, the vinyl cyanide compound, and the emulsifier may be fed first, and then the initiator and the oxidation-reduction catalyst may be fed batchwise, and graft polymerization may be performed. In this case, since polymerization efficiency is improved, a graft-polymerized latex having a high grafting degree and a high conversion rate may be prepared.

In addition, the first polymerization step may be performed, for example, for 10 to 30 minutes while maintaining the temperature of the reactor at 30 to 60° C. or 40 to 60° C.

B) Second Polymerization Step

In the second polymerization step of the present invention, the remainder of the aromatic vinyl compound and the vinyl cyanide compound is fed when a polymerization conversion rate reaches, for example, 5 to 40%, 10 to 30% or 10 to 20%, and graft polymerization is performed. By feeding the remainder of the monomers at this point, a graft copolymer having a high polymerization conversion rate and a high grafting degree may be obtained. Ultimately, physical properties, such as impact resistance, of a resin composition may be improved.

The aromatic vinyl compound and the vinyl cyanide compound may be the same as those used in the first polymerization step.

As a specific example, in the second polymerization step, the aromatic vinyl compound may be fed in an amount of 15 to 30 parts by weight or 20 to 30 parts by weight, and the vinyl cyanide compound may be fed in an amount of 5 to 15 parts by weight or 5 to 12 parts by weight. Within this range, a graft copolymer having a high grafting degree may be prepared.

In addition, in the second polymerization step, a molecular weight modifier and an initiator may be used.

For example, the molecular weight modifier may include alkyl mercaptan compounds, such as t-dodecylmercaptan, t-tetradecylmercaptan, n-tetradecylmercaptan, n-octylmercaptan, sec-octylmercaptan, n-nonylmercaptan, n-decylmercaptan, n-dodecylmercaptan, and n-octadecylmercaptan, preferably t-dodecylmercaptan.

For example, the molecular weight modifier may be fed in an amount of 0.05 to 0.5 parts by weight or 0.1 to 0.3 parts by weight. Within this range, a graft-polymerized latex having a high grafting degree may be prepared.

For example, the initiator of the second polymerization step may be the same as that used in the first polymerization step, and may be used in an amount of 0.05 to 0.5 parts by weight or 0.1 or 0.3 parts by weight. Within this range, it may be advantageous in terms of improvement in polymerization efficiency and reduction in undesired residues.

As a specific example, in the second polymerization step, graft polymerization may be performed while continuously feeding an emulsion containing 15 to 30 parts by weight of the aromatic vinyl compound, 5 to 15 parts by weight of the vinyl cyanide compound, 0.05 to 0.5 parts by weight of the molecular weight modifier, and 0.05 to 0.5 parts by weight of the initiator when a polymerization conversion rate reaches 5 to 40% or 10 to 30%.

In the second polymerization step, by continuously feeding the emulsion, a graft-polymerized latex having a high grafting degree and a high polymerization conversion rate may be obtained, and the amount of undesired residues remaining in the latex may be reduced. Accordingly, a resin composition having excellent appearance properties, such as discoloration resistance and whiteness, may be provided.

In addition, the second polymerization step may be performed at a reaction temperature which is 5 to 15° C. higher than the reaction temperature of the first polymerization step. In this case, polymerization efficiency may be further improved.

C) Third Polymerization Step

In the third polymerization step of the present invention, the phosphate ester-based reactive emulsifier represented by Formula 1 is fed when a polymerization conversion rate reaches 75 to 95% or 75 to 85%, and graft polymerization is performed. When the phosphate ester-based reactive emulsifier is fed at this point, and graft polymerization is performed to prepare an ABS graft copolymer, the prepared ABS graft copolymer may serve as a compatibilizer capable of improving dispersibility and at the same time, serve as a heat stabilizer during preparation of a resin composition.

Since the phosphate ester-based reactive emulsifier has an allyl group at one end thereof, the emulsifier may be capable of being copolymerized with the vinyl cyanide compound and the aromatic vinyl compound. In addition, since the emulsifier has a phosphate functional group at the other end thereof, the emulsifier may serve as a metal deactivator and a heat stabilizer, thereby improving compatibility with a matrix resin during preparation of a resin composition. As a result, the resin composition may have excellent impact resistance, e.g., increased impact strength, excellent appearance characteristics, such as whiteness, and excellent heat resistance, e.g., reduced retention-associated heat discoloration.

For example, the phosphate ester-based reactive emulsifier may be an aqueous solution having a concentration of 10 to 30% by weight or 15 to 25% by weight. In this case, polymerization stability may be improved.

For example, the pH of the phosphate ester-based reactive emulsifier may be adjusted to 9.5 to 12 or 10 to 11 (when the concentration of the aqueous solution is 20% by weight) by adding a base, and then the emulsifier may be used to prepare a graft copolymer. In this case, the stability of the polymerized latex may not be reduced, and the prepared graft copolymer may have a high grafting degree and a high polymerization conversion rate.

For example, the base may be one or more selected from potassium hydroxide, sodium hydroxide, and aqueous ammonia.

For example, in the third polymerization step, the phosphate ester-based reactive emulsifier may be fed in an amount of 0.05 to 1 part by weight, 0.1 to 0.8 parts by weight, 0.1 to 0.5 parts by weight, or 0.1 to 0.3 parts by weight. Within this range, a final resin composition may have excellent impact resistance, appearance characteristics, and heat resistance.

In addition, in the third polymerization step, the phosphate ester-based reactive emulsifier is preferably continuously fed into a reactor. In this case, deviation in physical properties is reduced, and polymerization efficiency is improved. Thus, the amount of undesired residues remaining in the latex may be reduced during graft polymerization.

In addition, the third polymerization step may be, for example, performed at a reaction temperature of 70 to ° C. or 72 to 76° C. In this case, polymerization efficiency may be excellent.

D) Fourth Polymerization Step

The method of preparing an ABS graft copolymer according to the present invention may include a fourth polymerization step to further improve a polymerization conversion rate and a grafting degree. In the fourth polymerization step, an initiator and an oxidation-reduction catalyst are additionally fed after initiation or completion of the third polymerization step, and additional graft polymerization is performed while increasing temperature.

As a specific example, the initiator and the oxidation-reduction catalyst may be additionally fed when a polymerization conversion rate reaches 90 to 95% or 92 to 94% In this case, polymerization conversion rate and grafting degree may be further improved. Thus, process efficiency may be improved, and a high-quality graft copolymer may be obtained.

For example, the initiator and the oxidation-reduction catalyst used in the fourth polymerization step may be the same as those used in the first polymerization step.

For example, in the fourth polymerization step, the initiator may be additionally fed in an amount of 0.01 to 0.2 parts by weight or 0.03 to 0.1 parts by weight. Within this range, polymerization conversion rate and grafting degree may be further improved.

For example, in the fourth polymerization step, the oxidation-reduction catalyst may be additionally fed in an amount of 0.001 to 0.3 parts by weight or 0.05 to 0.2 parts by weight. Within this range, the activity of the initiator may be increased, and thus polymerization conversion rate and grafting degree may be further improved.

For example, the fourth polymerization step may be performed at a reaction temperature of 76 to 90° C. or 80 to 85° C. for 30 minutes to 1 hour. As another example, graft polymerization may be performed at a reaction temperature which is 5 to 10° C. higher than that of the third polymerization step.

According to the present invention, graft polymerization may be performed at a reaction temperature of 30 to 85° C. or 40 to 80° C. for 2 to 5 hours or 2.5 to 4.5 hours. A latex obtained after completion of the graft polymerization may have, for example, a polymerization conversion rate of 95% or more or 97% or more and a grafting degree of 40% or more or 45% or more, and the content of solidified substances contained in the latex may be, for example, 0.03% by weight or less.

In the present invention, a grafting degree can be, for example, calculated according to Equation 3 below:

$$\text{Grafting degree (\%)} = (\text{Weight of monomers grafted onto rubber polymer/Weight of graft copolymer}) \times 100 \quad \text{[Equation 3]}$$

In the present invention, the content of solidified substances can be, for example, calculated according to Equation 4 below.

$$\text{Content of solidified substances (\% by weight)} = (\text{Weight of solidified substances formed in reactor (g)/Total weight of rubber and monomers (g)}) \times 100 \quad \text{[Equation 4]}$$

E) Coagulation Step

The method of preparing an ABS graft copolymer according to the present invention may include a coagulation step, in which a coagulant is added to the latex after completion of polymerization, and coagulation is performed.

Coagulants commonly used in the art to which the present invention pertains are not particularly limited and may be used as the coagulant of the coagulation step. Preferably, a coagulant having a concentration of 5 to 15% by weight may be fed in an amount of 0.5 to 3 parts by weight or 1 to 2 parts by weight based on 100 parts by weight of the latex, and coagulation may be performed at 70 to 120° C. or 80 to 100° C.

For example, one or more selected from acid coagulants, such as sulfuric acid, hydrochloric acid, acetic acid, and formic acid, and metal salt coagulants, such as aluminium sulfate, calcium chloride, and magnesium sulfate, may be used as the coagulant, and a metal salt coagulant is preferably used in terms of appearance improvement.

In the coagulation step, an antioxidant may be further added to the latex in an amount of 0.1 to 3 parts by weight or 0.1 to 1 part by weight based on 100 parts by weight of the latex before the coagulant is added. In this case, a final resin composition may have excellent discoloration resistance and whiteness.

The coagulated latex may be subjected to conventional processes, including washing, dehydration, and drying, to obtain an ABS graft copolymer in a powder form.

The graft copolymer of the present invention may be prepared according to specific embodiments as follows. It should be noted that the embodiments are provided for the purpose of illustrating the present invention, and the scope of the present invention is not limited thereto.

As a specific example, the method of preparing an ABS graft copolymer according to the present invention may include A) a first polymerization step of feeding 50 to 70 parts by weight of a conjugated diene rubber latex, 5 to 15 parts by weight of an aromatic vinyl compound, 1 to 10 parts by weight of a vinyl cyanide compound, 0.05 to 1 part by weight of an emulsifier, 0.01 to 0.5 parts by weight of an initiator, and 0.001 to 0.5 parts by weight of an oxidation-reduction catalyst into a reactor batchwise, based on 100 parts by weight of the total composition containing the conjugated diene rubber latex, the aromatic vinyl compound, and the vinyl cyanide compound, and performing graft polymerization; B) a second polymerization step of performing graft polymerization while continuously feeding an emulsion containing 15 to 30 parts by weight of the aromatic vinyl compound, 5 to 15 parts by weight of the vinyl cyanide compound, 0.05 to 0.5 parts by weight of a molecular weight modifier, and 0.05 to 0.5 parts by weight of the initiator based on 100 parts by weight of the total composition when a polymerization conversion rate reaches 5 to 30%; and C) a third polymerization step of performing graft polymerization while continuously feeding 0.05 to 1 part by weight of a phosphate ester-based reactive emulsifier based on 100 parts by weight of the total composition when a polymerization conversion rate reaches 75 to 95%.

As another example, the method of preparing an ABS graft copolymer according to the present invention may include A) a first polymerization step of feeding 50 to 70 parts by weight of the conjugated diene rubber latex, 5 to 15 parts by weight of the aromatic vinyl compound, 1 to 10 parts by weight of the vinyl cyanide compound, 0.05 to 1 part by weight of the emulsifier, 0.01 to 0.5 parts by weight of the initiator, and 0.001 to 0.5 parts by weight of the oxidation-reduction catalyst into a reactor batchwise, based on 100 parts by weight of the total composition containing the conjugated diene rubber latex, the aromatic vinyl compound, and the vinyl cyanide compound, and performing graft polymerization; B) a second polymerization step of performing graft polymerization while continuously feeding an emulsion containing 15 to 30 parts by weight of the aromatic vinyl compound, 5 to 15 parts by weight of the vinyl cyanide compound, 0.05 to 0.5 parts by weight of the molecular weight modifier, and 0.05 to 0.5 parts by weight of the initiator based on 100 parts by weight of the total composition when a polymerization conversion rate reaches 5 to 30%; and C) a third polymerization step of performing graft polymerization while continuously feeding 0.05 to 1 part by weight of the emulsifier based on 100 parts by weight of the total composition when a polymerization conversion rate reaches 75 to 85%, wherein the emulsifier used in the first polymerization step and the third polymerization step is the phosphate ester-based reactive emulsifier represented by Formula 1. In this case, a grafting degree may be further improved, and the amount of residues remaining in the latex may be further reduced. Thus, a heat stabilizer need not be additionally added. Ultimately, a molded part having excellent mechanical properties, discoloration resistance, and whiteness may be provided.

As another example, the method of preparing an ABS graft copolymer according to the present invention may include A) a first polymerization step of feeding 55 to 65 parts by weight of the conjugated diene rubber latex (average particle diameter: 3,000 to 3,600 Å, gel content: 75 to 95% by weight), 5 to 10 parts by weight of the aromatic vinyl compound, 2 to 7 parts by weight of the vinyl cyanide compound, 0.1 to 0.5 parts by weight of the phosphate ester-based reactive emulsifier represented by Formula 1, 0.01 to 0.1 parts by weight of the initiator, and 0.01 to 0.3 parts by weight of the oxidation-reduction catalyst into a reactor batchwise, based on 100 parts by weight of the total composition containing the conjugated diene rubber latex, the aromatic vinyl compound, and the vinyl cyanide compound, and performing graft polymerization; B) a second polymerization step of performing graft polymerization while continuously feeding an emulsion containing 20 to 30 parts by weight of the aromatic vinyl compound, 5 to 12 parts by weight of the vinyl cyanide compound, 0.1 to 0.3 parts by weight of the molecular weight modifier, and 0.1 to 0.3 parts by weight of the initiator based on 100 parts by weight of the total composition when a polymerization conversion rate reaches 10 to 30%; and C) a third polymerization step of performing graft polymerization while continuously feeding 0.1 to 0.5 parts by weight of the phosphate ester-based reactive emulsifier represented by Formula 1 based on 100 parts by weight of the total composition when a polymerization conversion rate reaches 80 to 90% Within this range, a grafting degree may be further improved, and the amount of undesired residues remaining in the latex may be further reduced. Therefore, a molded part having excellent appearance characteristics, such as whiteness, and excellent mechanical properties may be provided.

The ABS graft copolymer may be mixed with a matrix resin to prepare a resin composition. Hereinafter, a resin composition including the ABS graft copolymer will be described.

The ABS graft copolymer of the present invention may be mixed with an aromatic vinyl compound-vinyl cyanide compound copolymer to obtain a thermoplastic resin composition. For example, the resin composition may include 10 to 50% by weight of the ABS graft copolymer and 50 to 90% by weight of the aromatic vinyl compound-vinyl cyanide compound copolymer. Within this range, a final molded part may have excellent physical properties, such as impact resistance and appearance characteristics, and processing and molding may be facilitated.

As another example, the thermoplastic resin composition may include 20 to 50% by weight of the ABS graft copolymer and 50 to 80% by weight of the aromatic vinyl compound-vinyl cyanide compound copolymer. Within this range, the inherent physical properties of an ABS graft copolymer may be maintained at a high level, and processability and moldability may be improved.

For example, the aromatic vinyl compound-vinyl cyanide compound copolymer may include 10 to 40% by weight or 20 to 35% by weight the vinyl cyanide compound and 60 to 90% by weight or 65 to 80% by weight of the aromatic vinyl compound. In this case, processability and moldability of the resin composition may be improved without deteriorating physical properties, such as impact resistance, of an ABS graft resin.

The thermoplastic resin composition may be obtained by uniformly kneading the ABS graft copolymer and the aromatic vinyl compound-vinyl cyanide compound copolymer, and then extruding the kneaded product. When kneading is performed, additives, such as a lubricant, an antioxidant, and a lubricant, may be further added.

For example, the additive may be contained in an amount of 0.1 to 5% by weight or 0.5 to 3% by weight based on the total weight of the composition. Within this range, the effects of the additive may be realized without deteriorating physical properties of the resin composition.

Since the thermoplastic resin composition according to the present invention includes the ABS graft copolymer in which the amount of undesired residues that deteriorate thermal stability are reduced, there is no need to additionally add a heat stabilizer. Thus, the thermoplastic resin composition is a heat stabilizer-free resin composition.

In the present invention, the term "heat stabilizer-free" means that a heat stabilizer is not intentionally added when the thermoplastic resin composition is prepared.

In addition, when whiteness (thickness of specimen: ⅛") is measured according to ASTM D1925, whiteness of specimens prepared by injection-molding the resin composition may be, for example, 55 or more, 55 to 60, or 57 to 60. Thus, appearance characteristics of the resin composition are excellent.

In addition, when impact strength (thickness of specimen: ¼") is measured according to ASTM D256, impact strength of specimens prepared by injection-molding the resin composition may be, for example, 18.5 kgcm/cm or more, 19 to 20 kgcm/cm, or 19.5 to 23 kgcm/cm. Thus, impact resistance of the resin composition is excellent.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLE

Example 1

1. Preparation of ABS Graft Copolymer
First Polymerization Step:

60 parts by weight (based on solids) of a polybutadiene rubber latex having an average particle diameter of 3,200 Å and a gel content of 90%, 140 parts by weight of deionized water, 0.3 parts by weight of a fatty acid salt, 7.5 parts by weight of styrene and 2.5 parts by weight of acrylonitrile as a monomer were fed into a nitrogen-substituted polymerization reactor (autoclave), and the temperature of the reactor was adjusted to 50° C., and then 0.05 parts by weight of cumene hydroperoxide, 0.09 parts by weight of sodium pyrophosphate, 0.12 parts by weight of dextrose, and 0.002 parts by weight of ferrous sulfide were fed into the reactor batchwise.

Second Polymerization Step:

Then, when a polymerization conversion rate reaches 10%, a mixture containing 22.5 parts by weight of styrene, 7.5 parts by weight of acrylonitrile, 0.2 parts by weight of t-dodecylmercaptan, and 0.12 parts by weight of cumene hydroperoxide were continuously fed into the reactor while raising the temperature to 75° C. for 2 hours.

Third Polymerization Step:

When a polymerization conversion rate reaches 75% (30 minutes after start of continuous feed), 0.1 parts by weight (based on solids, 20% by weight of an aqueous solution, pH 10 (adjusted with KOH)) of a phosphate ester-based reactive emulsifier (REASOAP PP-70, DENKA Co.) was continuously fed for 1 hour and 30 minutes.

Fourth Polymerization Step:

After completion of continuous feeding, when a polymerization conversion rate reaches 95%, 0.06 parts by weight of cumene hydroperoxide, 0.04 parts by weight of sodium pyrophosphate, 0.06 parts by weight of dextrose, and 0.001 parts by weight of ferrous sulfide were fed, and the temperature was raised to 80° C. for 30 minutes, and the temperature was maintained at ° C. for 30 minutes to terminate the reaction. At this time, a polymerization conversion rate was 98%, the content of solidified substances was 0.03% by weight, and a grafting degree was 37%.

Coagulation Step:

0.5 parts by weight of an antioxidant mixture (winstay-L/IR1076=0.8/0.2 weight ratio) was added to the prepared ABS graft latex. Then, the ABS graft latex was coagulated with an aqueous solution of magnesium sulfate, washed and dried to obtain an ABS graft copolymer powder.

2. Preparation of Thermoplastic Resin Composition

An ABS graft copolymer powder, a styrene-acrylonitrile copolymer (MW: 140,000 g/mol; containing 28% by weight of acrylonitrile), and additives were added into a mixer so that the final rubber content was 15% by weight, mixed and then pelletized using an extruder, and specimens for measuring physical properties were prepared using an injection molding machine.

Example 2

Except that, in the third polymerization step of Example 1, 0.3 parts by weight of a reactive emulsifier was fed when a conversion rate reached 80%, an ABS graft copolymer was prepared in the same manner as in Example 1.

Example 3

Except that, in the first polymerization step of Example 2, a reactive emulsifier was fed instead of a fatty acid salt, an ABS graft copolymer was prepared in the same manner as in Example 2.

Example 4

Except that, in the third polymerization step of Example 2, a reactive emulsifier was fed when a conversion rate reached 95%, an ABS graft copolymer was prepared in the same manner as in Example 2.

Comparative Example 1

Except that, in the third polymerization step of Example 2, 0.3 parts by weight of a fatty acid salt was fed instead of 0.3 parts by weight of a reactive emulsifier, an ABS graft copolymer was prepared in the same manner as in Example 2.

Comparative Example 2

Except that, in the third polymerization step of Example 1, the amount of a reactive emulsifier was changed from 0.1 parts by weight to 1.5 parts by weight, an ABS graft copolymer was prepared in the same manner as in Example 1.

Comparative Example 3

Except that, in the third polymerization step of Example 2, 0.3 parts by weight of a reactive emulsifier was continuously fed when a polymerization conversion rate reached 10%, an ABS graft copolymer was prepared in the same manner as in Example 2.

Comparative Example 4

Except that, in the third polymerization step of Example 2, 0.3 parts by weight of a reactive emulsifier was continuously fed when a polymerization conversion rate reached 25%, an ABS graft copolymer was prepared in the same manner as in Example 2.

Comparative Example 5

Except that, in the third polymerization step of Example 2, 0.3 parts by weight of a reactive emulsifier was continuously fed when a polymerization conversion rate reached 50%, an ABS graft copolymer was prepared in the same manner as in Example 2.

Comparative Example 6

Except that, in the first polymerization step of Example 1, instead of omitting feed of a fatty acid salt, 1.0 part by weight of a reactive emulsifier was fed, and except that, in third polymerization step, a reactive emulsifier was not fed, an ABS graft copolymer was prepared in the same manner as in Example 1.

Test Example

The properties of the ABS graft latex prepared according to Examples and Comparative Examples and the specimens were measured using the following methods, and the obtained results are shown in Table 1 below.

1. Polymerization conversion rate (%): 2 g of the latex was dried in a hot air dryer at 150° C. for 15 minutes, and the weight thereof was measured to determine total solids content (TSC), and polymerization conversion rate was calculated using Equation 1.

2. Grafting degree (%): 2 g of the ABS graft copolymer powder was added to 300 ml of acetone, and stirred for 24 hours. The mixed solution was separated using an ultracentrifuge, and the separated acetone solution was added dropwise to methanol to obtain a non-grafted portion. The non-grafted portion was dried at 60 to 120° C., and the weight thereof was measured. The grafting degree was calculated using Equation 3.

3. Content of solidified substances (% by weight): After completion of polymerization, the weight of solidified substances formed in a reactor, the weight of total rubber, and the weight of monomers were measured. The content of solidified substances was calculated using Equation 4.

4. Whiteness: Whiteness of specimens having a thickness of ⅛" was measured using a Spectrogard Color System according to ASTM D1925.

5. Retention-associated heat discoloration: The resin compositions were retained in an injection machine at a high temperature of 250° C. for 15 minutes and then injection molding was performed. The color value was measured using a color-difference meter and discoloration degree ($\Delta E$) was calculated using the following equation.

$$\Delta E = \sqrt{((L-L'')^2 + (a-a'')^2 + (b-b'')^2)}$$

L, a, b=Color values measured after injection molding without retaining the resin composition at high temperature L", a", b"=Color values measured after injection molding after retaining the resin composition at high temperature 6. Izod impact strength (kgcm/cm): The Izod impact strength of specimens having a thickness of ¼" was measured according to ASTM D256.

TABLE 1

|  |  | Examples | | | | Comparative Examples | | | | | |
| --- | --- | --- | --- | --- | --- | --- | --- | --- | --- | --- | --- |
|  |  | 1 | 2 | 3 | 4 | 1 | 2 | 3 | 4 | 5 | 6 |
| Rubber content | | 60 | 60 | 60 | 60 | 60 | 60 | 60 | 60 | 60 | 60 |
| Batch fed/continuously fed monomers | | 7/33 | 7/33 | 7/33 | 7/33 | 7/33 | 7/33 | 7/33 | 7/33 | 7/33 | 7/33 |
| Non-reactive emulsifier | | 0.3 | 0.3 | — | 0.3 | 0.3/0.3[b)] | 0.3 | 0.3 | 0.3 | 0.3 | — |
| Reactive emulsifier | Feed time (conversion rate %) | 75 | 80 | 0/80 | 95 | — | 75 | 5 | 25 | 50 | 0 |
| | Feed amount | 0.1 | 0.3 | 0.3/0.3[a)] | 0.3 | — | 1.5 | 0.3 | 0.3 | 0.3 | 1.0[c)] |
| Polymerization conversion rate [%] | | 97.1 | 97.6 | 97.7 | 97.3 | 97.2 | 92.5 | 95.1 | 95.7 | 96.5 | 85.2 |
| Content of solidified substances [% by weight] | | 0.03 | 0.02 | 0.02 | 0.03 | 0.04 | 0.12 | 0.1 | 0.07 | 0.06 | 0.2 |
| Grafting degree [%] | | 40 | 41 | 45 | 40 | 38 | 35 | 33 | 37 | 38 | 25 |
| Whiteness | | 56 | 56 | 57 | 57 | 54 | 55 | 54 | 54 | 56 | 52 |
| Retention-associated heat discoloration ($\Delta E$) | | $\Delta$1.2 | $\Delta$1.2 | $\Delta$1.0 | $\Delta$1.2 | $\Delta$2.1 | $\Delta$1.2 | $\Delta$1.9 | $\Delta$1.6 | $\Delta$1.4 | $\Delta$2.1 |
| Impact strength [kgcm/cm] | | 18.9 | 19.3 | 21.5 | 19.2 | 18.3 | 17.4 | 18.4 | 18.4 | 19.3 | 15.3 |

In Table 1, rubber content, batch fed/continuously fed monomers, and emulsifier content are given in parts by weight based on 100 parts by weight of the total amount of the rubber latex, styrene, and acrylonitrile, and feed point of time of the non-reactive emulsifier refers to a polymerization conversion rate (%) when the emulsifier was fed.
[a)]At the initial stage of reaction (conversion rate: 0%) and a conversion rate of 80%, 0.3 parts by weight of the reactive emulsifier was fed.
[b)]At the initial stage of reaction (conversion rate: 0%) and a conversion rate of 75%, 0.3 parts by weight of the non-reactive emulsifier was fed.
[c)]At the initial stage of reaction (conversion rate: 0%), 1.0 part by weight of the reactive emulsifier was fed batchwise.

As shown in Table 1, compared to the copolymer of Comparative Example 1, in which the non-reactive emulsifier is used, the ABS graft copolymers of Examples 1 to 4, in which the phosphate ester-based reactive emulsifier is fed at a specific time point, have a high grafting degree while having a low content of solidified substances. In addition, compared to the compositions of Comparative Examples, the thermoplastic resin composition including the graft copolymer according to the present invention has a high whiteness value and a low retention-associated heat discoloration value, and has excellent impact strength.

In addition, when an ABS graft copolymer is prepared, as the amount of the phosphate ester-based reactive emulsifier is increased, the grafting degree is higher, and whiteness, discoloration resistance, and impact strength of specimens are further improved. In particular, in the case of Example 3, in which the reactive emulsifier is fed both in the first and third polymerization steps, all physical properties are excellent.

In addition, referring to the results of Comparative Example 2, although the reactive emulsifier is fed at the same time as in Example 1, since the reactive emulsifier was fed in an excess amount, in comparison with Example 1, the polymerization conversion rate and the grafting degree are somewhat reduced, and the content of solidified substances is greatly increased. That is, when the phosphate ester-based reactive emulsifier is used in an excess amount, polymerization efficiency and latex stability are deteriorated, and impact strength of the final resin composition is somewhat lowered.

In addition, in the case of Comparative Examples 3 and 5, in which experiments are performed as the same manner as in Example 2 except that the reactive emulsifier is fed when a conversion rate reaches 10 to 50%, in comparison with Example 2, the content of solidified substances is increased by 5 times, and the grafting degree and the conversion rate of polymers obtained after polymerization are somewhat lowered, and the physical properties of the final specimens are also deteriorated.

In addition, referring to the results of Comparative Example 6, when all of the reactive emulsifier is fed at the initial stage of the reaction and graft polymerization is performed, the polymerization conversion rate and the grafting degree are greatly lowered, and the content of solidified substances is greatly increased, and the physical properties, such as whiteness, retention-associated heat discoloration, and impact strength, of the final specimens are significantly deteriorated.

Referring to the results of Comparative Examples 3 to 6, stability and physical properties of the latex are further lowered as feed time of the reactive emulsifier approaches the initial stage of reaction. Based on the results, it can be confirmed that in addition to the amount of the phosphate ester-based reactive emulsifier, feed time of the emulsifier is also an important factor to be controlled.

These results suggest that the phosphate ester-based reactive emulsifier contributes to emulsification and stabilization of the latex, and at the same time, acts as a metal deactivator in the oxidation-reduction system.

The invention claimed is:

1. A method of preparing an ABS graft copolymer, comprising:
   A) a first polymerization step of feeding 50 to 70 parts by weight of a conjugated diene rubber latex (based on solids), 5 to 15 parts by weight of an aromatic vinyl compound, 1 to 10 parts by weight of a vinyl cyanide compound, 0.05 to 1 part by weight of an emulsifier, 0.01 to 0.5 parts by weight of an initiator, and 0.001 to 0.5 parts by weight of an oxidation-reduction catalyst into a reactor batchwise, based on 100 parts by weight of a total composition containing the conjugated diene rubber latex, the aromatic vinyl compound, and the vinyl cyanide compound, and performing graft polymerization;
   B) a second polymerization step of performing graft polymerization while continuously feeding an emulsion containing 15 to 30 parts by weight of the aromatic vinyl compound, 5 to 15 parts by weight of the vinyl cyanide compound, 0.05 to 0.5 parts by weight of a molecular weight modifier, and 0.05 to 0.5 parts by weight of the initiator based on 100 parts by weight of the total composition when a polymerization conversion rate reaches 5 to 40%; and
   C) a third polymerization step of performing graft polymerization while continuously feeding 0.05 to 1 part by weight of a phosphate ester-based reactive emulsifier based on 100 parts by weight of the total composition when a polymerization conversion rate reaches 75 to 95%, wherein the phosphate ester-based reactive emulsifier is a compound represented by Formula 1 below:

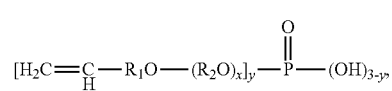

[Formula 1]

wherein $R_1$ is an alkylene having 1 to 10 carbon atoms, $R_2$ is a linear or branched alkylene having 3 to 10 carbon atoms, x is an integer of 1 to 4, and y is an integer of 1 to 3.

2. The method according to claim 1, wherein the phosphate ester-based reactive emulsifier is an aqueous solution containing the compound represented by Formula 1 in a concentration of 10 to 30 wt %.

3. The method according to claim 2, wherein a pH of the aqueous solution of the phosphate ester-based reactive emulsifier is adjusted to 9.5 to 12 by adding a base.

4. The method according to claim 3, wherein the base is one or more selected from potassium hydroxide, sodium hydroxide, and aqueous ammonia.

5. The method according to claim 1, wherein the emulsifier of the first polymerization step is one or more selected from a non-reactive emulsifier and the phosphate ester-based reactive emulsifier.

6. The method according to claim 1, wherein the conjugated diene rubber latex has a gel content of 65 to 95% by weight.

7. The method according to claim 1, wherein the graft polymerization is performed at a reaction temperature of 30 to 85° C. for 2.5 to 4.5 hours.

8. The method according to claim 1, further comprising a fourth polymerization step, in which, after initiation or completion of the third polymerization step, 0.01 to 0.2 parts by weight of the initiator and 0.001 to 0.3 parts by weight of the oxidation-reduction catalyst are additionally fed into the reactor, and graft polymerization is performed.

9. The method according to claim 1, wherein the latex obtained after completion of the graft polymerization has a polymerization conversion rate of 95% or more and a grafting degree of 40% or more.

10. The method according to claim 1, wherein the latex obtained after completion of the graft polymerization contains solidified substances in an amount of 0.03% by weight or less.

11. A thermoplastic resin composition, comprising 10 to 50% by weight of the ABS graft copolymer prepared according to claim 1 and 50 to 90% by weight of an aromatic vinyl compound-vinyl cyanide compound copolymer.

12. The thermoplastic resin composition according to claim 11, wherein, when whiteness is measured according to ASTM D1925, the thermoplastic resin composition has a whiteness of 55 or more.

13. The thermoplastic resin composition according to claim 11, wherein, when impact strength is measured according to ASTM D256, the thermoplastic resin composition has an impact strength of 18.5 kgcm/cm or more.

14. The thermoplastic resin composition according to claim 11, wherein the composition is a heat stabilizer-free resin composition.

* * * * *